(12) United States Patent
Kuo et al.

(10) Patent No.: US 11,267,044 B2
(45) Date of Patent: Mar. 8, 2022

(54) METHOD FOR MANUFACTURING A SHELL MOLD

(71) Applicant: METAL INDUSTRIES RESEARCH & DEVELOPMENT CENTRE, Kaohsiung (TW)

(72) Inventors: Shin-Hong Kuo, Pingtung (TW); Cheng-Bo Wu, Pingtung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 136 days.

(21) Appl. No.: 16/724,901

(22) Filed: Dec. 23, 2019

(65) Prior Publication Data

US 2021/0187593 A1   Jun. 24, 2021

(51) Int. Cl.
*B22C 9/02*        (2006.01)
*B22C 9/04*        (2006.01)
*B22D 15/00*       (2006.01)
*B33Y 80/00*       (2015.01)
*B33Y 10/00*       (2015.01)

(52) U.S. Cl.
CPC ................ *B22C 9/04* (2013.01); *B33Y 10/00* (2014.12); *B33Y 80/00* (2014.12)

(58) Field of Classification Search
CPC .... B22C 9/00; B22C 9/02; B22C 9/04; B22C 9/082; B33Y 10/00; B33Y 80/00; B22D 15/00; C04B 2235/6026
USPC ....... 164/21, 23, 24, 516, 361, 4.1, 122, 125
See application file for complete search history.

(56) References Cited

FOREIGN PATENT DOCUMENTS

CN         1873648 A  * 12/2006  ............. G06F 17/50
CN       106734852 A     5/2017

OTHER PUBLICATIONS

Machine translation of CN 1873648 A (Year: 2006).*

* cited by examiner

*Primary Examiner* — Kevin P Kerns
(74) *Attorney, Agent, or Firm* — Alan D. Kamrath; Karin L. Williams; Mayer & Williams PC

(57) ABSTRACT

A method for manufacturing a mold includes providing first information regarding a location of a shrinkage hole generated during hardening of a molten metal in a shell mold. Second information regarding a change in the location of the shrinkage hole in response to adjustment of a heat transfer rate of the shell mold is obtained. The heat transfer rate of the shell mold is adjusted to shift the shrinkage hole to a predetermined location.

8 Claims, 3 Drawing Sheets

METHOD FOR MANUFACTURING A SHELL MOLD

BACKGROUND OF THE INVENTION

1. Field of the Invention

The present invention relates to a method for manufacturing a shell mold and, more particularly, to a method for manufacturing a shell mold by filling a molten metal to form a predetermined casting.

2. Description of the Related Art

Generally, investment casting includes using a wax to produce a wax mold with a predetermined shape. Then, dipping in slurry and coating of sand are repeated on the wax mold to form a coating layer on the wax mold. After the coating layer hardens, the wax mold is dissolved to obtain a shell mold. Finally, molten metal is filled into the shell mold, and a predetermined metal casting is obtained after the molten metal hardens. However, when the molten metal hardens, a shrinkage hole is generated due to heat expansion/cold shrinkage or different cooling rates at different portions of the metal casting. In an approach, replenishing holes are added in the shell mold to proceed with replenishment of the molten metal, thereby avoiding the shrinkage hole. However, the replenishing holes affect the raw material loss rate and the yield of the casting as well as increasing difficulties in formation of the shell mold and subsequent treatment costs.

Thus, improvement to the conventional investment casting is required.

SUMMARY OF THE INVENTION

To solve the above problems, an objective of the present invention is to provide a method for manufacturing a shell mold to improve the casting quality.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

As used herein, the term "one" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "join", "assembly", or similar terms is used to include separation of connected members without destroying the members after connection or inseparable connection of the members after connection. A person having ordinary skill in the art would be able to select according to desired demands in the material or assembly of the members to be connected.

A method for manufacturing a mold includes providing first information regarding a location of a shrinkage hole generated during hardening of a molten metal in a shell mold, obtaining second information regarding a change in the location of the shrinkage hole in response to adjustment of a heat transfer rate of the shell mold, and adjusting the heat transfer rate of the shell mold to shift the shrinkage hole to a predetermined location.

Thus, the method for manufacturing a shell mold according to the present invention measures the change in the location of the shrinkage hole resulting from different heat transfer rates in the shell mold, and the change can be used to determine the pattern of the shell mold. As to manufacture of the shell mold into which the molten metal is filled, the hardening direction of the molten metal in the shell mold can be controlled to shift the shrinkage hole to the predetermined location. Thus, the quality of the casting is increased, and the costs are reduced.

In an example, the method includes changing a thickness of the shell mold to adjust the heat transfer rate of the shell mold to thereby obtain the change in the location of the shrinkage hole. Thus, the hardening direction of the molten metal in the shell mold can be controlled.

In an example, the method includes obtaining the second information regarding the change in the location of the shrinkage hole while forming a thickened portion in the shell mold, and adjusting a thickness of the thickened portion to shift the shrinkage hole to the predetermined location. Thus, the hardening direction of the molten metal in the shell mold can be controlled.

In an example, forming the thickened portion includes increasing a thickness of a portion of the shell mold by 2-7 times the thickness of the shell mold to form the thickened portion. Thus, by forming the thickened portion on the shell mold, the shell mold can influence the cooling and hardening of the molten metal to adjust the location of the shrinkage hole.

In an example, the shell mold includes a casting chamber and a pouring chamber intercommunicating with the casting chamber. The thickened portion is aligned with the pouring chamber. Thus, the shrinkage hole can be shifted to a location completely in the pouring chamber.

In an example, the shell mold includes a relatively thinner portion and a relatively thicker portion that forms the thickened portion. The relatively thinner portion of the shell mold corresponds to a relatively thicker portion of a casting to be formed. The relatively thicker portion of the shell mold corresponds to a relatively thinner portion of the casting to be formed. This avoids generation of the shrinkage hole on the casting due to the relatively thicker portion having a lower cooling rate. Furthermore, the shrinkage hole can be shifted to another location to thereby control the shrinkage hole to locate in a specific portion.

In an example, the method includes using a high thermal conductivity material and a low thermal conductivity material to form different portions of the shell mold, and adjusting the heat transfer rate of the shell mold to thereby obtain the change in the location of the shrinkage hole. Thus, the location of the shrinkage hole can be controlled to locate in the specific portion.

In an example, the high thermal conductivity material includes ferric oxide, glass fiber, or polyester plaster. The low thermal conductivity material includes magnesium oxide, zirconium oxide, or molten quartz. Thus, a more delicate temperature gradient can be created to further control the hardening direction of the molten metal and to more precisely control the location of the shrinkage hole.

In an example, the relatively thinner portion is made of the high thermal conductivity material, and the relatively thicker portion is made of the low thermal conductivity material. Thus, a more delicate temperature gradient can be created to further control the hardening direction of the molten metal and to more precisely control the location of the shrinkage hole.

In an example, the method includes using a powder supply unit of a 3D printing device to supply a powder material on a working surface, flattening the powder material onto the working surface by a flattening unit, and spraying an adhesive by a jet printing unit to stack the powder material to thereby form the shell mold. Thus, thickness of each portion of the shell mold can be precisely controlled while permitting easy formation of the thickened portion at a predetermined location of the shell mold.

In an example, the method includes obtaining the second information regarding the change in the location of the shrinkage hole while forming a thinned portion in the shell mold; and adjusting a thickness of the thinned portion to shift the shrinkage hole to the predetermined location.

The present invention will become clearer in light of the following detailed description of illustrative embodiments of this invention described in connection with the drawings.

DETAILED DESCRIPTION OF THE INVENTION

A method for manufacturing a shell mold of an embodiment according to the present invention includes providing first information regarding a location of a shrinkage hole during hardening of a molten metal in a shell mold 1, and adjusting a temperature gradient in the shell mold 1 to shift the shrinkage hole to a predetermined location.

Figure 1:
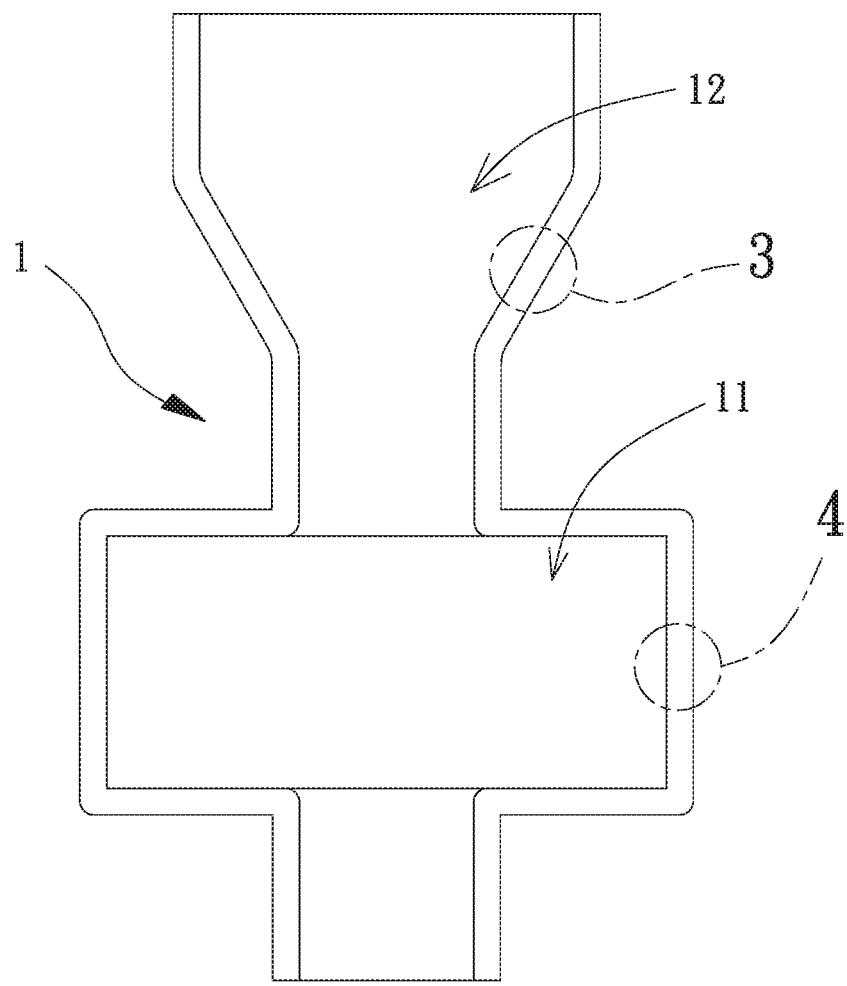
FIG. 1 is a diagrammatic view of a shell mold of a casting manufactured by a method of an embodiment according to the present invention.
Figure 2A:
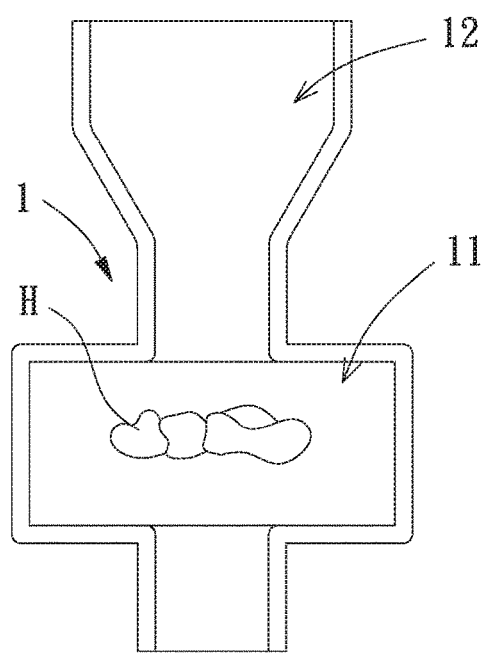
FIG. 2a is a diagrammatic view illustrating formation of a shrinkage hole in the method according to the present invention.

With reference to FIGS. 1 and 2a, the shell mold 1 includes a casting chamber 11 having a shape corresponding to an outline of a predetermined casting. Thus, the molten metal can be filled into the casting chamber 11 to form the predetermined casting after the motel metal hardens. The shell mold 1 further includes a pouring chamber 12 intercommunicating with the casting chamber 11. Thus, the molten metal can flow into the casting chamber 11 via the pouring chamber 12. When the molten metal in the casting chamber 11 hardens, a shrinkage hole H is generated due to heat expansion/cold shrinkage or different cooling rates at different portions of the casting. At this time, the location of the shrinkage hole H on the casting can be obtained.

With reference to FIG. 2a, in an example in which the molten metal is actually filled into the casting chamber 11, the location of the shrinkage hole H is known after the molten metal hardens and takes shape. In another example, conventional simulating software (such as FLOW 3D Cast) can be used to simulate the location of the shrinkage hole H after the molten metal takes shape in the shell mold 1, which a person of ordinary skill in the art would understand, and will not be described in detail herein.

Figure 2B:
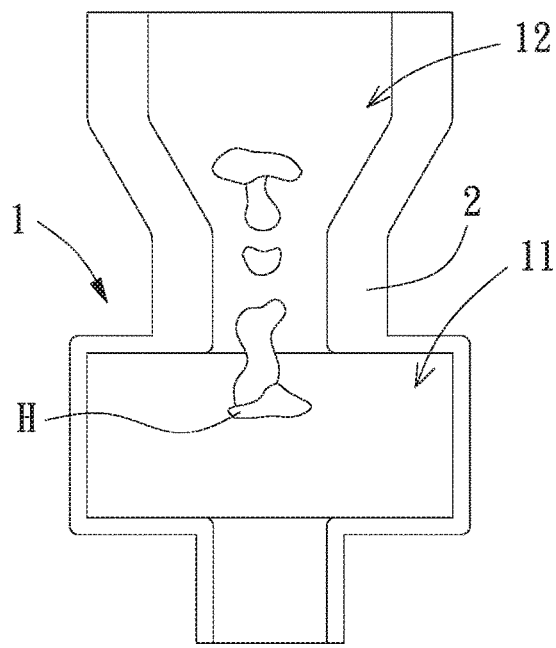
FIG. 2b is a diagrammatic view illustrating shifting of the shrinkage hole to a casting chamber and a pouring chamber.
Figure 2C:
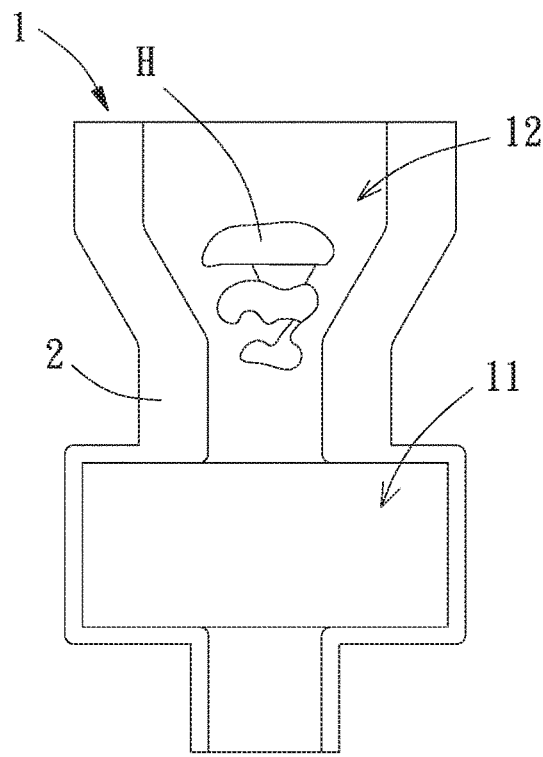
FIG. 2c is a diagrammatic view illustrating shifting of the shrinkage hole to the pouring chamber.
Figure 2D:
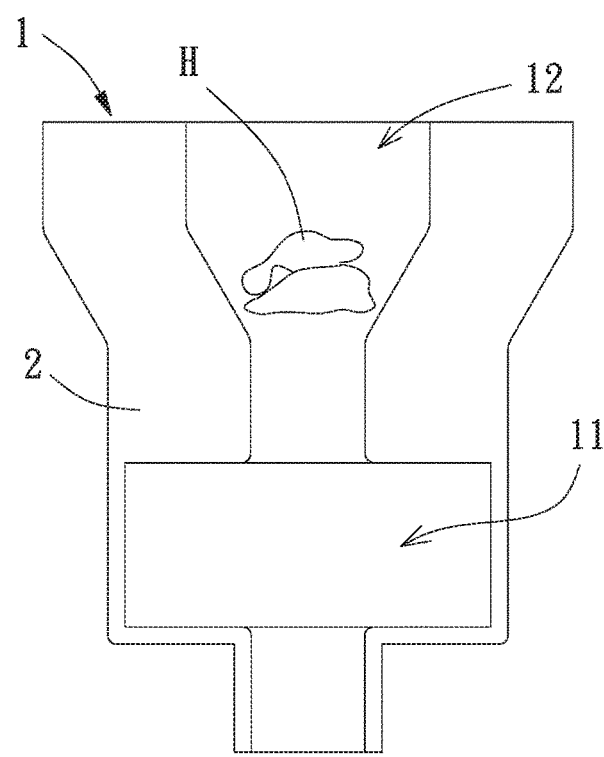
FIG. 2d is a diagrammatic view illustrating complete shifting of the shrinkage hole to the pouring chamber.

With reference to FIGS. 2b-2d, when the molten metal in the shell mold 1 starts to cool down and harden, a temperature gradient is formed in the shell mold 1 due to the shell mold 1 itself. Namely, the molten metal in the shell mold 1 has different cooling rates due to different heat transfer rates of the shell mold 1. As an example, the thickness of the shell mold 1 can be adjusted to provide the shell mold 1 with different heat transfer rates. The following description is based on simulation of the above simulating software. The thickness of any portion of the shell mold 1 can be varied to change the heat transfer rate at that portion. For example, the thickness of the shell mold 1 can be increased to reduce the heat transfer rate. Alternatively, the thickness of the shell mold 1 can be reduced to increase the heat transfer rate. In this embodiment, a thickened portion 2 is formed on the shell mold 1. Namely, the shell mold 1 has a larger thickness at the thickened portion 2 of the shell mold 1. Preferably, the thickness of a portion of the shell mold 1 is increased outwards to form the thickened portion 2. This avoids a change in the shape of the chamber of the shell mold 1. Specifically, the shell mold 1 has an initial uniform thickness. When the thickened portion 2 is formed on the shell mold 1, the thickened portion 2 has a larger thickness than the initial uniform thickness. In this embodiment, the thickness of a portion of the shell mold 1 is increased by 2-7 times the initial uniform thickness. It is worth noting that when the molten metal in the shell mold 1 starts to cool down and harden, the cooling rate of a portion of the molten metal at a relatively thicker portion of the shell mold 1 is smaller, such that a shrinkage hole is generated at the relatively thicker portion of the shell mold 1 after the molten metal hardens. Thus, by forming the thickened portion 2 on the shell mold 1, the shell mold 1 can vary the cooling and hardening of the molten metal to adjust the location of the shrinkage hole H. Alternatively, the thickness of a portion of the shell mold 1 can be reduced to form a relatively thinner portion, thereby reducing the cooling time at the relatively thinner portion. Thus, the shrinkage hole H is less likely to be generated at the relatively thinner portion. This also affects the cooling and hardening of the molten metal to adjust the location of the shrinkage hole H. The present invention is not limited in this regard.

Specifically, the thickened portion 2 can be located outside of the casting chamber 11. Namely, the thickened portion 2 is not aligned with the casting chamber 11. In this embodiment, the thickened portion 2 is aligned with the pouring chamber 12. After the molten metal in the shell mold 1 cools down and hardens, the location of the shrinkage hole H can be distributed in the casting chamber 11 and the pouring chamber 12, as shown in FIG. 2b. When the thickness of the thickened portion 2 is increased, the location of the shrinkage hole H to be generated on the casting gradually shifts towards the pouring chamber 12. Finally, when the molten metal cools down and hardens in the shell mold 1, the shrinkage hole H is completely in the pouring chamber 12, as shown in FIG. 2d. A worker can adjust the location and thickness of the thickened portion 2 by trial and error, and, finally, the shrinkage hole H can be completely located in the pouring chamber 12 of the shell mold 1. Alternatively, the above software can be used to simulate the location shifting of the shrinkage hole H in response to the change in the thickened portion 2, reducing the material consumption and saving costs. Furthermore, a relatively thinner portion can be formed at a portion of the shell mold 1 aligned with the casting chamber 11, such that when the molten metal cools down and hardens in the shell mold 1, the shrinkage hole H will not be formed in the casting chamber 11 but will be in the pouring chamber 12. Thus, by providing a relative change in the thickness of the shell mold 1, the molten metal in the shell mold 1 has different cooling rates and, thus, has the temperature gradient that can produce a directional hardening of the molten metal. Namely, the molten metal includes different portions having different cooling rates (from high to low) in the shell mold 1, and the shrinkage hole H is generated in the portion with a low cooling rate (the relatively thicker portion of the shell mold 1, i.e., the thickened portion 2). Furthermore, the location of the shrinkage hole H can be shifted to the pouring chamber 12 under control. Accordingly, the worker can proceed with actual filling of the molten metal into the shell mold 1 obtained by the above method. After the molten metal cools down and takes shape, the shrinkage hole H can be removed while trimming the sprue, obtaining a complete casting without the shrinkage hole H.

Furthermore, the thickened portion 2 of the shell mold 1 can be changed to a thinned portion 2 (not shown) according to the outline of the casting. For example, the shell mold 1 includes a relatively thinner portion (corresponding to a relatively thicker portion of a casting to be formed) and a relatively thicker portion (corresponding to a relatively thinner portion of the casting to be formed) that forms the thickened portion 2. In other words, the method for manufacturing the shell mold 1 includes obtaining information (the second information) regarding the change in the location of the shrinkage hole while forming the thinned portion in the shell mold, and then adjusting a thickness of the thinned portion to shift the shrinkage hole to the predetermined location. This avoids generation of the shrinkage hole H on the relatively thicker portion of the casting due to a lower cooling rate. Furthermore, the shrinkage hole H can be shifted to another location to thereby control the shrinkage hole H to locate in a specific portion.

Figure 3:
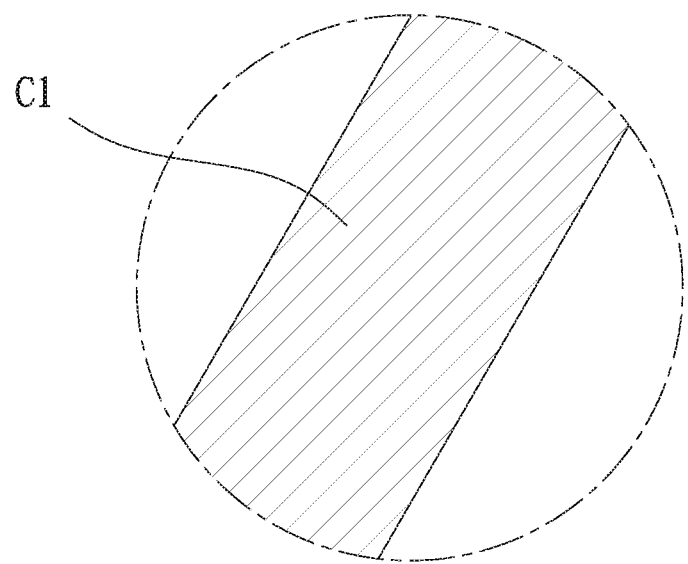
FIG. 3 is an enlarged view of a circled portion 3 of FIG. 1.
Figure 4:
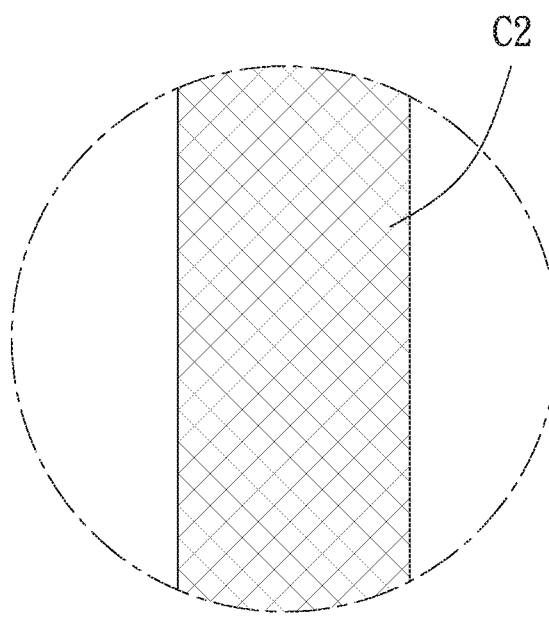
FIG. 4 is an enlarged view of a circled portion 4 of FIG. 1.

With reference to FIGS. 1, 3, and 4, different materials of different thermal conductivities can be used to form different portions of the shell mold 1, adjusting the heat transfer rate of the shell mold 1. For example, a portion of the shell mold 1 can be formed by a low thermal conductivity material C1, such that the cooling of a portion of the molten metal at the low thermal conductivity material C1 is slower, resulting in the shrinkage hole H after cooling down and hardening. In an example, the low thermal conductivity material C1 is used to form a portion of the shell mold 1 having the pouring chamber 12. Alternatively, a high thermal conductivity material C2 is used to form a portion of the shell mold 1, such that the cooling of the molten metal at the high thermal conductivity material C2 is faster. For example, the high thermal conductivity material C2 is used to form a portion of the shell mold 1 having the casting chamber 11 with a little change of generation of the shrinkage hole H. The high thermal conductivity material C2 includes ferric oxide, glass fiber, or polyester plaster. The low thermal conductivity material C1 includes magnesium oxide, zirconium oxide, or molten quartz. The present invention is not limited in this regard. Alternatively, the high thermal conductivity material C2 and the low thermal conductivity material C1 can be mixed to form a mixture having an intermediate thermal conductivity between the high and low thermal conductivities, and the mixture can be used to adjust the heat transfer rate of the shell mold 1. Thus, materials of different thermal conductivities can be used to form the shell mold 1 to provide the molten metal in the shell mold 1 with different cooling rates to thereby provide the temperature gradient while causing directional hardening of the molten metal.

It is worth noting that a more delicate temperature gradient can be obtained by varying the relative change in the thickness of the shell mold 1 and using different thermal conductivity materials. For example, the high thermal conductivity material C2 is used to form the relatively thinner portion of the shell mold 1 to increase the cooling rate of a relatively thicker portion of the casting after formation, and the low thermal conductivity material C1 is used to form the relatively thicker portion of the shell mold 1. Thus, a more delicate temperature gradient can be created to further control the hardening direction of the molten metal and to more precisely control the position of the shrinkage hole H.

In an example of manufacture, a 3D printing device can be used to produce the shell mold 1. Specifically, a powder supply unit of a 3D printing device to supply a powder material (such as a ceramic material) on a working surface. The powder material on the working surface is flattened by a flattening unit. Then, an adhesive is sprayed by a jet printing unit. The procedures are repeated to stack the powder material to thereby form the shell mold 1. Thus, thickness of each portion of the shell mold 1 can be precisely controlled while permitting easy formation of the thickened portion 2 at a predetermined location of the shell mold 1. Furthermore, by changing the powder material of the powder supply unit, different portions of the shell mold 1 can be formed by the high thermal conductivity material C2 and the low thermal conductivity material C1, creating a more delicate temperature gradient.

In view of the foregoing, the method for manufacturing a shell mold according to the present invention measures the change in the location of the shrinkage hole H resulting from different heat transfer rates in the shell mold 1, and the change can be used to determine the pattern of the shell mold 1. As to manufacture of the shell mold 1 into which the molten metal is filled, the hardening direction of the molten metal in the shell mold 1 can be controlled to shift the shrinkage hole H to the predetermined location. Thus, the quality of the casting is increased, and the costs are reduced.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method for manufacturing a shell mold comprising:
providing first information regarding a location of a shrinkage hole generated during hardening of a molten metal in a shell mold;
forming a thickened portion or a thinned portion in the shell mold to adjust a heat transfer rate of the shell mold;
obtaining second information regarding a change in the location of the shrinkage hole in response to adjustment of the heat transfer rate of the shell mold; and
shifting the shrinkage hole to a predetermined location by adjusting a thickness of a corresponding one of the thickened portion and the thinned portion to adjust the heat transfer rate of the shell mold.

2. The method for manufacturing the shell mold as claimed in claim 1, wherein forming the thickened portion includes increasing a thickness of a portion of the shell mold by 2-7 times the thickness of the shell mold to form the thickened portion.

3. The method for manufacturing the shell mold as claimed in claim 1, wherein the shell mold includes a casting chamber and a pouring chamber intercommunicating with the casting chamber, and wherein the thickened portion is aligned with the pouring chamber.

4. The method for manufacturing the shell mold as claimed in claim 1, wherein the shell mold includes a relatively thinner portion and a relatively thicker portion that forms the thickened portion, wherein the relatively thinner portion of the shell mold corresponds to a relatively thicker portion of a casting to be formed, and wherein the relatively thicker portion of the shell mold corresponds to a relatively thinner portion of the casting to be formed.

5. The method for manufacturing the shell mold as claimed in claim 1, wherein the method includes providing a high thermal conductivity material and a low thermal conductivity material that correspond to different portions of the shell mold, and adjusting the heat transfer rate of the shell mold to thereby obtain the change in the location of the shrinkage hole.

6. The method for manufacturing the shell mold as claimed in claim 5, wherein the high thermal conductivity material includes ferric oxide, glass fiber, or polyester plaster, and wherein the low thermal conductivity material includes magnesium oxide, zirconium oxide, or molten quartz.

7. The method for manufacturing the shell mold as claimed in claim 5, wherein the relatively thinner portion is made of the high thermal conductivity material, and wherein the relatively thicker portion is made of the low thermal conductivity material.

8. The method for manufacturing the shell mold as claimed in claim 1, wherein the method includes using a powder supply unit of a 3D printing device to supply a powder material on a working surface; flattening the powder material onto the working surface by a flattening unit; and spraying an adhesive by a jet printing unit to stack the powder material to thereby form the shell mold.

* * * * *